United States Patent [19]

Willows et al.

[11] Patent Number: 5,505,635
[45] Date of Patent: Apr. 9, 1996

[54] ZERO INSERTION FORCE BATTERY RECEPTACLE

[75] Inventors: Keith S. Willows; Michael J. Black, both of Seattle, Wash.

[73] Assignee: Fluke Corporation, Everett, Wash.

[21] Appl. No.: 344,368

[22] Filed: Nov. 23, 1994

[51] Int. Cl.⁶ ................................................ H01K 3/00
[52] U.S. Cl. ............................................. 439/500; 429/97
[58] Field of Search ............... 429/96, 97; 439/259–264, 439/500, 911

[56] References Cited

U.S. PATENT DOCUMENTS

| | | | |
|---|---|---|---|
| 4,491,378 | 1/1985 | Crawford | 439/325 |
| 5,007,859 | 4/1991 | Sangregory et al. | 439/500 |
| 5,211,579 | 5/1993 | Seong et al. | 439/500 |
| 5,404,090 | 4/1995 | Shinbori | 429/97 |
| 5,413,499 | 5/1995 | Wright, Jr. et al. | 439/500 |

*Primary Examiner*—David L. Pirlot
*Assistant Examiner*—Jill Demello
*Attorney, Agent, or Firm*—Seed and Berry

[57] ABSTRACT

A zero insertion force receptacle for a battery powered device including a battery storage area having a pair of parallel battery cradles. A pair of stationary contacts are positioned at the first end of the cradles and a pivotable connector is positioned at the second end of the cradles. The pivotable connector includes a pair of actuator arms which are engaged by a shoulder on a removable cover as the cover is closed. The shoulder displaces the actuator arms and causes the pivotable connector to rotate about a pair of pivot pins to bring a pair of contact arms into engagement with the batteries. As the closing of the cover increases, the actuator arms are pivoted further about the pivot pins to increase the force between the contact arms and the batteries. In the preferred embodiment, the actuator arms are linked to the contact arms by spring sections. Because the pivotable connector includes a conductive path between the contact arms, the pivotable connector forms an electrical connection between the batteries.

20 Claims, 2 Drawing Sheets

ZERO INSERTION FORCE BATTERY RECEPTACLE

TECHNICAL FIELD

This invention relates to receptacles for batteries, and more particularly, a battery receptacle that does not stress the electrical contacts of the battery receptacle when the battery is inserted, yet firmly holds the battery against the electrical contacts after the battery has been inserted in the receptacle.

BACKGROUND OF THE INVENTION

Portable electronic test and measurement instruments allow tests and measurements to be performed quickly and easily in a variety of locations. Such devices are typically powered by batteries stored in a battery receptacle within the device. Over their lifetimes, such devices typically require battery replacement several times, with such replacements being made under a variety of conditions.

In conventional devices, the battery receptacle includes an elongated recess having at least one resilient contact at either end and a stationary or resilient contact at the other end. Batteries having contacts on their ends are inserted into the receptacle by pressing the batteries into the receptacle. The batteries must be inserted into the receptacles with sufficient force to displace at least one of the contacts so that the contacts can slide along the ends of the battery.

Conventional resilient battery contacts suffer from repeated flexing of the contacts, reducing the resiliency of the contacts. If the resiliency of the contacts is reduced sufficiently, the force exerted on the batteries is reduced, and the reliability of the electrical connection between the contact and the battery may be undermined. Furthermore, since the frictional force between the contacts and the batteries is sometimes used to hold the batteries in place, a loss of contact resiliency can reduce the frictional force to a level that fails to retain the batteries in position.

In an alternative form of battery receptacle found in common flashlights, the batteries are inserted into a cylindrical receptacle having a contact at a first end. A screw-on cover mounts to the second end and carries a spring which forms the second contact. Such receptacles do not permit batteries to be aligned in a side-by-side arrangement. Also, because the second contact is carried by the cover, an electrical connection must be made between the second contact and the battery powered device as the cover is screwed into place. Typically, this electrical connection is achieved by a metal contact at an outer edge of the cover which slidably engages an annular ring within the cylindrical receptacle, near the second end. Such sliding contacts often form failure sites.

SUMMARY OF THE INVENTION

A zero insertion force receptacle is for use in an electrical device is adapted to be powered by a battery of the type having a battery contact at each end. The receptacle includes a battery storage area sized and shaped to receive the battery through a battery storage opening and a battery cover sized and shaped to cover the battery storage area opening. An electrical contact is mounted in the battery storage area and positioned to make electrical contact with a first one of the battery contacts.

The receptacle also includes a first movable electrical contact in the battery storage area, adjacent the second battery contact and an actuating mechanism coupled to the first movable contact. The actuating mechanism is movable between a first position in which it moves the first movable contact against the second battery contact and a second position where it allows the first movable contact to be moved apart from the second battery contact. The actuating mechanism contacts the cover to pivot the actuating mechanism from the second position to the first position as the cover is closed.

In one embodiment, when the battery is placed in the battery storage area and the cover is closed, the actuating mechanism is moved from the second position to the first position by rotating about a pivot axis in response to the cover being closed. The receptacle also includes a support positioned in the battery storage area and an actuating mechanism having a first arm carrying the movable contact and a second arm intersecting the first arm. The actuating mechanism is pivotably mounted on a support at a mounting location substantially at the intersection between the actuating arm and the first and second arms. The mounting location of the actuating mechanism and the angle between the first and second arms is such that the second arm contacts the cover as the cover is closed, thereby pivoting the first arm toward the second battery contact so that the first movable battery contact engages the second battery contact. The first and second arms are integrally formed with the actuating arm and are resiliently coupled by arms spring sections.

In one embodiment, the battery storage area is sized to receive a second battery in a side-by-side configuration with the first battery and the receptacle includes a second movable contact coupled to the actuating mechanism and electrically connected to the first movable contact. The second movable contact is positioned to make contact with the battery contact of the second battery when the actuating mechanism is in the first position.

In one embodiment, the actuating mechanism includes a pivotable connector for connecting adjacent batteries in the battery receptacle. The connector is pivotable about a pivot axis and includes an actuating lever intersecting the pivot axis at a first location and projecting away from the pivot action in a first direction normal to the pivot axis. The connector also includes first and second contact arm intersecting the pivot axis at a second location and coupled to pivot in correspondence with the actuating lever. The first and second contact arm project away from the pivot axis in a second direction. A first electrical contact is carried by the first contact arm for contacting one of the terminals of the first battery and a second electrical contact is carried by the second contact arm for contacting one of the terminals of a second battery. The connector also includes a first and second spring sections for resiliently coupling the first and second contact arms to the actuating lever. In one embodiment, the actuating lever includes first and second actuator arms projecting in the first direction and coupled to the first and second contact arms, respectively. The lever also includes a connector arm linking the first actuator arm to the second actuator arm for maintaining synchronous movement of the first and second actuator arms. The first and second actuator arms, the first and second contact arms and the connector arm are integrally formed as a unitary piece.

DETAILED DESCRIPTION OF THE INVENTION

Figure 1:
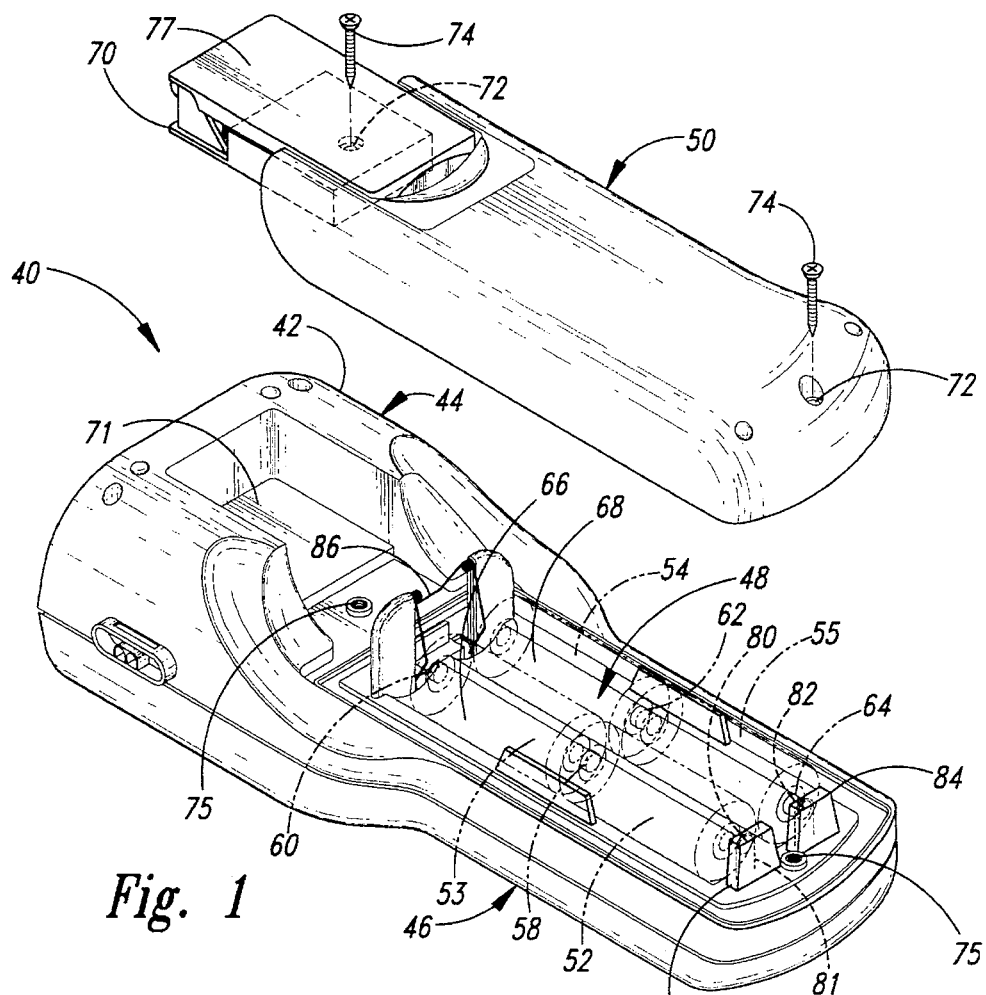
FIG. 1 is an isometric view of a preferred embodiment of the invention with the cover separated from the housing.

Shown in FIG. 1 is a hand-held, battery-powered device 40, such as an electronic test and measurement instrument. The instrument 40 includes a housing 42 formed from molded plastic as a unitary piece that has a relatively wide display portion 44 and a relatively narrow handle portion 46. A recess in the handle portion 46 defines a battery storage area 48 to which a cover 50, described in greater detail below, mates.

First and second pairs of batteries 52, 53 and 54, 55 (shown in phantom) are placed in the battery storage area 48. Each of the batteries 52–55 is of a conventional, generally cylindrical type having a battery contact at each end. The positive terminals of the batteries include protruding contacts 58, 60, 62, 64 (shown in phantom) projecting from one end. As is conventional, the protruding contacts 58, 60, 62, 64 form the positive terminals of the batteries 52–55 and metallic surfaces at the other ends of the batteries form the negative terminals.

Figure 2:
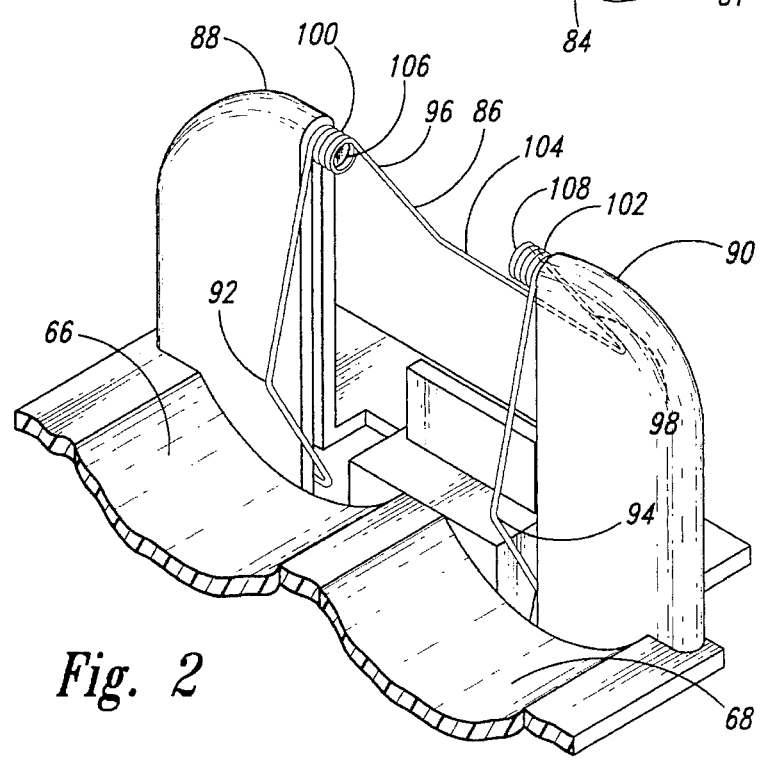
FIG. 2 is an isometric detail view of a portion of the device of FIG. 1 showing the pivotable connector at the end of the battery guides.

First and second battery cradles 66, 68, are formed in the lower surface of the battery storage area 48 by an adjacent pair of partially cylindrical depressions (best seen in the detailed view of FIG. 2). The cradles 66, 68 receive pairs of batteries 52, 53 and 54, 55.

Each battery cradle 66, 68 is sized to allow the two respective batteries to be laid end-to-end between a first end of the battery cradles 66, 68 adjacent the display portion 44 and a second end at the end of the handle portion 46. The curved lower surface of each of the battery cradles 66, 68, engages portions of outer surfaces of its respective pair of batteries 52, 53 or 54, 55 to hold the batteries in end-to-end alignment. In this position, the positive terminal of a first one of the batteries 52 or 54 in each pair contacts the negative terminal of the second battery 53 or 55. In the first battery cradle 66, the negative terminals of the batteries 52, 53 face the second end of the battery cradle 66, while in the second battery cradle 68, the negative terminals of the batteries 54, 55 face the first end. While the battery cradles 66, 68 in the preferred embodiment retain respective pairs of batteries 52–55, it will be understood that each of the battery cradles may be sized to accommodate only one battery or more than two batteries.

The cover 50 is a molded plastic panel of sufficient size to cover the battery storage area and enclose the batteries 52–55. The cover 50 is shaped with an exterior surface that conforms to the handle portion 46 such that, when the cover 50 is attached to the housing 42, the handle portion 46 and cover 50 can be easily grasped by a user. A pair of holes 72 permit a respective pair of screws 74 to pass through the cover 50 to engage corresponding screw holes 75 in the handle portion 46 to secure the cover 50 to the housing 42. To help maintain alignment of the cover 50 in its closed position, the edge of the cover at the periphery of the battery storage area 48, and a ridge 76 (FIGS. 3–5) in the cover 50 engages a slot 78 that extends around the periphery of the battery storage area 48. A flexible gasket 79 surrounds the edge of the cover 50 and the ridge 76. The gasket 79 engages the lower surface of the battery storage area 48 and forms a substantially watertight seal when the cover 50 is attached. The gasket 79 helps to keep moisture and contaminants out of the battery storage area 48.

An integral cover extension 70 projects from the cover 50 behind the display portion 44 and fits snugly into a cavity 71 in the display portion 44. The cover extension 70 helps maintain the cover 50 in alignment when the cover 50 is in its closed position. Also, the cover extension includes a belt clip 77 for holding the device 40 on a user's belt to free the user's hands.

A first stationary contact 80 (best seen in FIGS. 3–5) is positioned adjacent the second end of the first battery cradle 66 and a second stationary contact 82 (shown in phantom in FIG. 1) is positioned at the second end of the second battery cradle 68. The first and second stationary contacts 80, 82 form input terminals to operate the device 40 under power from the batteries 52–55. The first and second stationary contacts 80, 82 are substantially identical in structure. Therefore, the following description will focus primarily on the structure of the first stationary contact 80.

Figure 3:
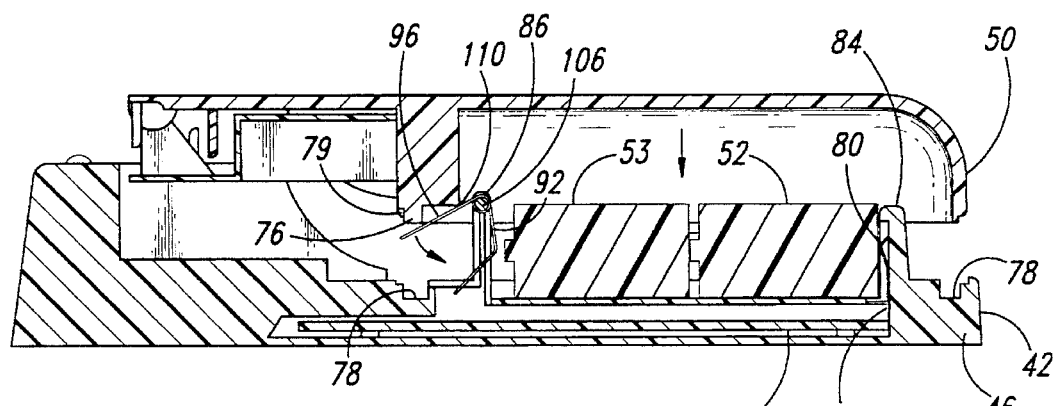
FIG. 3 is a side cross-sectional view of the embodiment of FIG. 1 showing the cover spaced apart from the housing.

As best seen in FIG. 3, the stationary contact 80 is formed by a cantilevered finger of conductive, resilient material. The contact 80 projects from the lower surface of the battery storage area 48 and extends inwardly from a rigid brace 84 which is integral to the housing 42. Thus, the contact 80 is resiliently biased against the end of the battery 52 to absorb shocks, it is stationary as compared to movable contacts described below. The first stationary contact 80 is aligned to engage the negative terminal of the first battery 52 when the first battery is in the first battery cradle 66. Similarly, the second stationary contact 82 (FIG. 1) is positioned to contact the positive terminal 64 of the fourth battery 55 when the battery 55 is in the second battery cradle 68. At their opposite ends, the planar members 81 are electrically connected to a printed circuit board 85 carrying conductors (not shown) connected to electrical components (not shown) in the device 40.

A pivotable connector 86 (shown in greater detail in FIG. 2) is mounted to a pair of connector supports 88, 90 at the first end of the battery cradles 66, 68. The pivotable connector 86 provides a mechanism for electrically connecting the first pair of batteries 52, 53 to the second pair of batteries 54, 55 while simultaneously providing a force to retain the batteries 52, 55 in contact with the stationary contacts 80, 82. The force also maintains the batteries 52–55 in contact with each other. The connector supports 88, 89 are rigid plastic mounting platforms, integral to the housing 42 and extending upwardly from the lower surface of the battery storage area 48.

With reference to FIG. 2, the pivotable connector 86 includes a pair of contact arms 92, 94, corresponding actuator arms 96, 98, corresponding spring sections 100, 102 and a connector arm 104. The actuator arms 96, 98 project from the connector supports 88, 90 away from the battery storage area 48 and are resiliently connected to their corresponding actuator arms 96, 98 by the corresponding helically wound spring sections 100, 102. The spring sections 100, 102 surround respective pivot pins 106, 108 that project laterally from each of the connector supports 88, 90 toward the other. The pivot pins 106, 108 thus pivotally support the pivotable connector 86. The connector arm 104 extends between the actuator arms 96, 98 to link them such that the pivotable connector 86 is a unitary element. Preferably, the pivotable connector 86 is integrally formed from a resilient conductor, such as a stainless steel wire. However, other structures, such as planar members, may be used in place of the contact arms 92, 94 and/or the actuator arms 96, 98 without departing from the scope of the invention.

Each of the contact arms 92, 94 projects from its corresponding spring section 100, 102 toward the lower surface of the battery storage area 48. Each contact arm 92, 94 is bent such that a central section of the contact arm protrudes toward the corresponding battery 53 or 54. The contact arms 92, 94 are positioned such that each bent portion is able to engage a terminal of the corresponding battery 53 or 54 when the pivotable connector 86 is pivoted to engage the batteries, as described below.

To insert the batteries 52–55, the cover 50 is removed from the housing 42, as shown in FIG. 1. When the cover 50 is removed, the pivotable connector 86 is free to pivot such that the contact arms 92, 94 rotate away from the second ends of the battery cradles 76, 78 (clockwise in the view of FIG. 2). In this state, the batteries 52–55 may be inserted freely into the battery storage area 48 without any significant force since the contact arms 92, 94 do not exert any force on the batteries 52–55.

After the batteries 52–55 are inserted, the cover 50 is closed. To close the cover 50, it is first aligned with the handle portion 46, above the battery storage area, using the cover extension 70 and the cavity 71 as a guide. Then, the cover 50 is moved toward the handle portion 46 until it is in the closed position. The screws 74 are inserted through the holes 72 in the screw holes 75 and tightened to secure the cover 50 to the handle portion 46.

Advantageously, as the cover 50 is moved to the closed position, it actuates the pivotable connector 86 to engage the batteries 53, 54 to ensure electrical contact and provide a retention force. The actuation of the pivotable connector 86 is best seen in the sequence presented in FIGS. 3, 4 and 5. As shown in FIG. 3, as the cover 50 descends toward handle portion 46, a shoulder 110 on the cover 50 engages the actuator arms 96, 98 applying downward force to the actuator arms 96, 98. In response to the downward force, the actuator arms 96, 98 cause the pivotable connector 86 to pivot counterclockwise (as viewed in FIG. 3 ) about the pivot pins 106, 108. The rotation of the pivotable connector 86 brings the contact arms 92, 94 toward the batteries 53, 54 (only contact arm 92 and battery 53 are visible in FIG. 3), as indicated by the arrows.

Figure 4:
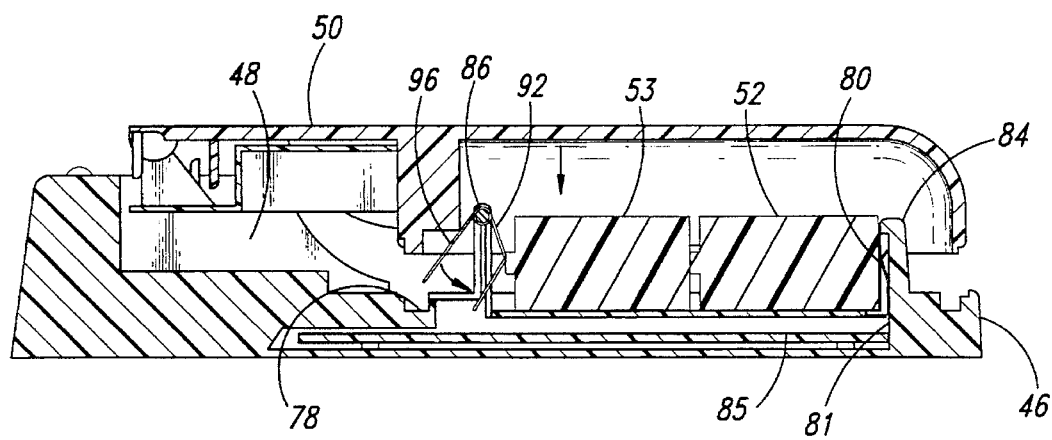
FIG. 4 is a side cross-sectional view of the device of FIG. 3 showing the cover moved toward engagement with the housing relative to the position of FIG. 2.

As the cover 50 is brought closer to engagement with the handle portion 46, the pivotable connector 86 pivots until the bent section of the contact arm 92 contacts the positive terminal of the second battery 53, as shown in FIG. 4. When the pivotable connector is in this position, the bent section of the other contact arm 94 (not visible in FIGS. 3–5) will also engage the negative terminal of its adjacent battery 54. At this point, the cover 50 is still spaced apart from the handle portion 46.

Figure 5:
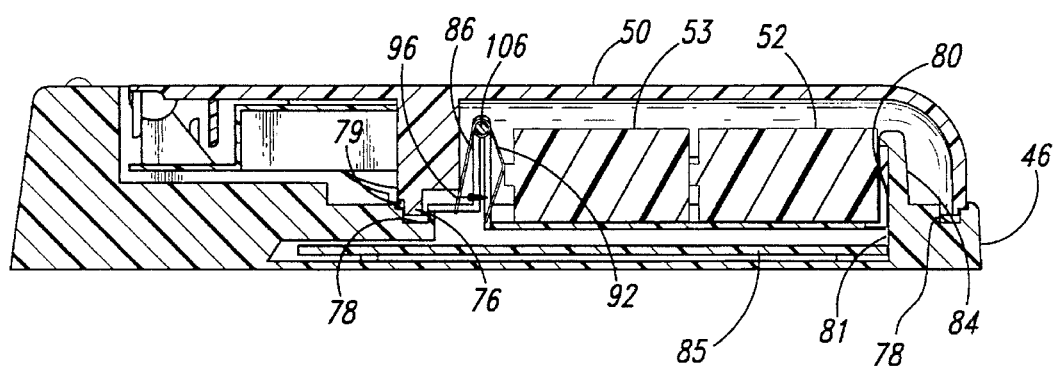
FIG. 5 is a side cross-sectional view of the device of FIG. 3 showing the cover moved into a closed position.

As shown in FIG. 5, when the cover 50 is moved further downwardly to its closed position, the actuator arms 96, 98 continue pivoting counterclockwise about the pivot pins 106, 108. However, the contact arms 92, 94 are prevented from pivoting further about the pivot pins 106, 108 because of their contact with the batteries 53, 54. Because the actuator arms 96, 98 are pivoting and the contact arms 92, 94 are stationary, the angle between the actuator arms 96, 98 and the contact arms 92, 94 changes, flexing the spring sections 100, 102 and placing them under tension. The tension in the spring sections 100, 102 results in the contact arms 92, 94, being resiliently forced against the positive terminal of the battery 53 and the negative terminal of the battery 54, respectively.

Because the connector arm 104 mechanically couples the actuator arms 96, 98 to each other, the contact arms 92, 94 are moved synchronously into resilient engagement with the respective terminals of the batteries 53, 54 as the cover 50 is closed. The engagement of the contact arms 92, 94 with their respective batteries 53, 54, causes electrical contact between the contact arms 92, 94 and the batteries 53, 54. Because the pivotable connector 86 is formed from a single conductive piece, the pivotable connector 86 provides a conductive path between the positive terminal of the battery 53 and the negative terminal of the adjacent battery 54. Consequently, the pivotable connector 86 completes the serial connection of the batteries 52–55 between the stationary battery contacts 80, 82. Also, the resilient forces applied by the contact arms 92, 94 to their respective pairs of batteries 52, 53 and 54, 55 force the batteries into contact with each other and the stationary battery contacts 80, 82, ensuring electrical connection thereto.

As can be seen by comparing FIGS. 4 and 5, the points of contact between the shoulder 110 and the actuator arms 96, 98 slide down the actuator arms as the cover 50 closed, and the angle of the actuator arms 96, 98 relative to the direction of movement of the shoulder 110 decreases. The torque applied to the spring sections 100, 102 increases as the distance between the points of contact and the pivot pins 106, 108 increase. The torque applied to the spring sections 100, 102 also increases as the angle of the actuator arms 96, 98 relative to the movement of the shoulder 110 decreases. Thus, as the cover 50 is moved toward its closed position, the torque applied to the spring sections 100, 102 increases. This increasing torque is translated by the spring sections into increasing torque on the contact arms 92, 94 thereby increasing the force between the bent sections of the contact arms and their respective battery terminals.

The batteries 52–55 are removed from the device 40 by following substantially the reverse process described above. First, the screws 74 are loosened and removed, freeing the cover 50 for removal. As the cover is removed, the tension in the spring sections 100, 102 is released and the pivotable connector 86 flexes causing the actuator arms 96, 98 to rotate clockwise (as viewed in FIGS. 3, 4, 5) and move away from the contact arms 92, 94. When the cover 50 is completely removed, the pivotable connector 86 rotates freely such that the contact arms 92, 94 are no longer in contact with the batteries 53, 54. The batteries 52–55 may then be removed from the battery storage area without any removal force.

While the preferred embodiment described herein employs four batteries 52–55, it will be seen by those skilled in the art that the inventive structure may be utilized with different numbers of batteries or with different battery structures. For example, the battery cradles 76, 78 may be extended to include more than two batteries or may be shortened to accommodate only a single battery each. Also, a single battery cradle may be used with one or more batteries by forming an electrical connection between the electric components and the pivotable connector 86 in a conventional manner, such as through a cable. In such a structure, the pivotable connector would form one power input and a stationary contact would form the other.

From the foregoing, it will be appreciated that, although embodiments of the invention have been described herein for purposes of illustration, various modifications may be made without deviating from the spirit and scope of the invention. Accordingly, the invention is not limited except as by the appended claims.

We claim:

1. In an electrical device adapted to be powered by batteries of the type having a battery contact at each end, a zero insertion force receptacle for said batteries comprising:

a housing;

a battery storage area in said housing, said battery storage area being sized and shaped to receive a first one of said batteries therein through a battery storage area opening;

a battery cover sized and shaped to cover said battery storage area opening when said cover is placed in a closed position;

a first electrical contact mounted in said battery storage area in a position where it can make electrical contact with one of said battery contacts of said first battery when said first battery is inserted in said battery storage area;

a first movable electrical contact positioned in said battery storage area adjacent the other of said battery contacts of said first battery when said first battery is inserted in said battery storage area; and an actuating mechanism mounted in said housing and coupled to said first movable contact, said actuating mechanism movable between a first position in which said actuating mechanism displaces said first movable contact against the other of said battery contacts, and a second position in which said actuating mechanism allows said first movable contact to be spaced apart from the other of said battery contacts, said actuating mechanism making contact with said cover to move said actuating mechanism from said second position to said first position as said cover is placed in its closed position whereby said first movable contact is spaced apart from the other of said battery contacts when said first battery is inserted in said battery storage area and said first movable contact is thereafter placed in contact with the other of said battery contacts as said cover is placed in its closed position.

2. The zero insertion force battery receptacle of claim 1 wherein said actuating mechanism is resiliently coupled to said movable contact so that said movable contact is resiliently biased against the other of said battery contacts when said actuating mechanism is in said first position.

3. The zero insertion force battery receptacle of claim 1 wherein said first battery is placed in said battery storage area by moving said first battery in a direction normal to said battery storage area opening, wherein said cover is placed in its closed position by moving said cover in said normal direction, and wherein said actuating mechanism is moved from said second position to said first position by rotating said actuating mechanism about a pivot axis in response to said cover moving in said normal direction.

4. The zero insertion force battery receptacle of claim 3 wherein said actuating mechanism comprises:

a support positioned in said battery storage area adjacent the other of said battery contacts when said first battery is positioned in said battery storage area; and a pivotable connector having a first member carrying said first movable contact and a second member intersecting said first member at an angle, said pivotable connector being pivotably mounted on said support at a mounting location substantially at the intersection between said first and second members, the mounting location of said pivotable connector and the angle between said first and second members being such that said second member contacts said cover as said cover is moved to its closed position thereby pivoting said first member toward the other of said battery contacts so that said first movable battery contact engages the other of said battery contacts.

5. The zero insertion force battery receptacle of claim 4 wherein said cover is generally planar and includes an actuating member sized and positioned so that said actuating member contacts said second member when said cover is being placed in its closed position to apply a pivoting force to said second member to cause said second member to pivot about the mounting location.

6. The zero insertion force battery receptacle of claim 4 wherein said first and second members are integrally formed with each other.

7. The zero insertion force receptacle of claim 6 wherein the first and second members are resiliently coupled by a spring section integrally formed with said first and second members and intermediate said first and second members.

8. The zero insertion force battery receptacle of claim 1 wherein said battery storage area is sized to receive a second battery in a side-by-side configuration with said first battery, and wherein said receptacle further includes a second movable contact coupled to said actuating mechanism and electrically connected to said first movable contact, said second movable contact being positioned to make contact with a battery contact of said second battery when said actuating mechanism is in said first position.

9. The zero insertion force battery receptacle of claim 8 wherein said actuating mechanism comprises:

a first contact arm carrying said first movable contact;

a first actuating arm intersecting said first contact arm at an angle and coupled to said first actuating arm, the angle between said first contact arm and said first contact arm being such that said first actuating arm contacts said cover as said cover moves to its closed position thereby pivoting said first contact arm toward said first battery so that said first movable battery contact engages said other battery contact of first battery;

a second contact arm carrying said second movable contact;

a second actuating arm intersecting said second contact arm at an angle and coupled to said actuating arm, the angle between said second actuating arm and said second contact arm being such that said second actuating arm contacts said cover as said cover moves to its closed position thereby pivoting said second contact arm toward the second battery so that said second movable battery contact engages said battery contact of the second battery; and a connector arm coupling the first actuating arm to the second actuating arm such that said first and second actuating arms pivot synchronously.

10. In an electrical device adapted to be powered by batteries of the type having a negative terminal at a first end and a positive terminal at a second end, a zero insertion force receptacle for said batteries comprising:

a battery storage area in said electrical device having a first end and a second end, said battery storage area being sized and shaped to receive a plurality of said batteries therein through a battery storage area opening and to hold a first one of said batteries adjacent and parallel to a second one of said batteries with said negative terminal of said first battery and said positive terminal of said second battery facing said first end of said battery storage area;

a battery cover sized and shaped to cover said battery storage area opening when said cover is placed in a closed position;

a first electrical contact mounted in said battery storage area in a position where it can make electrical contact with said negative terminal of said first battery when said batteries are inserted in said battery storage area;

a second electrical contact mounted in said battery storage area in a position where it can make electrical contact with said positive terminal of said second battery when said batteries are inserted in said battery storage area;

a pivotable connector mounted in said battery storage area and pivotable about a pivot axis between a first position and a second position;

a first movable electrical contact carried by said pivotable connector and pivoting with said pivotable connector to contact said positive terminal of said first battery when said pivotable connector is in said first position and to disengage said positive terminal of said first battery when said pivotable connector is in said second position; and a second movable electrical contact electrically connected to said first movable contact and carried by said pivotable connector and pivoting with said pivotable connector to contact said negative terminal of said second battery when said pivotable connector is in said first position and to disengage said negative terminal of said second battery when said pivotable connector is in said second position.

11. The zero insertion force battery receptacle of claim 10 wherein said pivotable connector includes an actuating arm, wherein said cover is placed in its closed position by moving said cover in a direction normal to said battery storage opening, and wherein said cover engages said actuating arm when said cover is moved in said normal direction, thereby pivoting said pivotable connector from said second position to said first position.

12. The zero insertion force battery receptacle of claim 11 wherein said pivotable connector further includes first and second contact arms intersecting said actuating arm at said pivot axis, said first and second contact arms projecting from said actuating arm and carrying said first and second movable contacts, respectively.

13. The zero insertion force battery receptacle of claim 12 wherein said pivotable connector further includes a first spring intermediate said first contact arm and said actuating arm, and a second spring intermediate said contact arm and said actuating arm such that said first and second contact arms are resiliently connected to said actuating arm.

14. The zero insertion force battery receptacle of claim 13 wherein said actuating arm, said first and second contact arms and said first and second springs are integral portions of a single metallic piece.

15. A pivotable connector for connecting adjacent batteries in a battery receptacle by pivoting about a pivot axis, the batteries being of a type having a terminal exposed at each end of the battery, comprising:

an actuating lever intersecting said pivot axis at a first location and projecting away from said pivot axis in a first direction normal to the pivot axis;

a first contact arm intersecting said pivot axis at a second location and coupled to pivot in correspondence with said actuating lever, said first contact arm projecting away from said pivot axis in a second direction normal to said pivot axis, said second direction being different from said first direction;

a second contact arm coupled to pivot in correspondence with said actuating lever, said second contact arm intersecting said pivot axis at a third location spaced apart from said second location, said second contact arm projecting away from the pivot axis in said second direction;

a first electrical contact carried by said first contact arm for contacting one of the terminals of a first one of the batteries; and a second electrical contact electrically connected to the first electrical contact and carried by said second contact arm for contacting one of the terminals of a second one of the batteries.

16. The pivotable connector of claim 15, further comprising:

a first spring section for resiliently coupling said first contact arm to said actuating lever; and a second spring section for resiliently coupling said second contact arm to said actuating lever.

17. The pivotable connector of claim 15 wherein the actuating lever comprises:

first and second actuator arms, projecting in said first direction and coupled to said first and second contact arms respectively; and a connector arm extending from said first actuating arm to said second actuating arm, for maintaining synchronous movement of said first and second actuator arms.

18. The pivotable connector of claim 17, further including:

a first pivoting mount at the intersection of said first actuator arm and said first contact arm; and a second pivoting mount at the intersection of said second actuator arm and said second contact arm, said first and second pivoting mounts supporting said pivotable connector and allowing said pivotable connector to pivot about said pivot axis.

19. The pivotable connector of claim 17 wherein said first and second actuator arms, said first and second contact arms and said connector arm are integrally formed as a unitary piece.

20. The pivotable connector of claim 19, further including:

an integral first spring section intermediate said first contact arm and said first actuator arm for resiliently coupling said first contact arm to said first actuator arm; and an integral second spring section intermediate said second contact arm and said second actuator arm for resiliently coupling said second contact arm to said second actuator arm.

* * * * *